(12) United States Patent
Borders et al.

(10) Patent No.: US 8,551,544 B2
(45) Date of Patent: Oct. 8, 2013

(54) PROTEIN ISOLATE COMPOSITIONS AND USES THEREOF

(75) Inventors: Cheryl K. Borders, Moweaqua, IL (US); W. Russell Egbert, Decatur, IL (US); M. Eric McEver, Mt. Olive, NC (US); Matthew J. Schaefer, Chicago, IL (US)

(73) Assignee: Archer Daniels Midland Company, Decatur, IL (US)

( * ) Notice: Subject to any disclaimer, the term of this patent is extended or adjusted under 35 U.S.C. 154(b) by 1557 days.

(21) Appl. No.: 11/473,662

(22) Filed: Jun. 23, 2006

(65) Prior Publication Data

US 2007/0014914 A1 Jan. 18, 2007

Related U.S. Application Data

(60) Provisional application No. 60/698,802, filed on Jul. 13, 2005.

(51) Int. Cl.
*A23L 1/00* (2006.01)

(52) U.S. Cl.
USPC .............................. 426/89; 426/656

(58) Field of Classification Search
USPC .......................................................... 426/89
See application file for complete search history.

(56) References Cited

U.S. PATENT DOCUMENTS

| | | | |
|---|---|---|---|
| 3,185,574 A | 5/1965 | Gabby et al. | |
| 3,431,112 A | 3/1969 | Durst | |
| 4,238,515 A | 12/1980 | Shemer | |
| 4,990,356 A | 2/1991 | Hamilton et al. | |
| 5,114,726 A * | 5/1992 | Tsau et al. | 426/289 |
| 5,705,207 A | 1/1998 | Cook et al. | |
| 5,736,178 A | 4/1998 | Cook et al. | |
| 5,747,648 A | 5/1998 | Bassi et al. | |
| 5,965,708 A | 10/1999 | Bassi et al. | |
| 5,977,312 A | 11/1999 | Bassi et al. | |
| 6,174,559 B1 | 1/2001 | Shulman et al. | |
| 6,197,353 B1 | 3/2001 | Shulman et al. | |
| 6,592,915 B1 * | 7/2003 | Froseth et al. | 426/93 |
| 2002/0168448 A1 * | 11/2002 | Mody | 426/74 |

(Continued)

FOREIGN PATENT DOCUMENTS

| | | |
|---|---|---|
| WO | WO 97/01965 | 1/1997 |
| WO | PCT/CA2000/00161 | 8/2000 |
| WO | WO/01/64051 | 9/2001 |

OTHER PUBLICATIONS

Gelski, J. "Protein Positives" in Baking & Snack, Feb. 2005, p. 79-82.*

(Continued)

*Primary Examiner* — Elizabeth Gwartney
(74) *Attorney, Agent, or Firm* — Andrew F. Nilles

(57) ABSTRACT

The various non-limiting embodiments of the present disclosure relate to a protein-based binder or coating system for particulate- and/or powder-type food systems, for example, to form nutritive ready-to-eat food bars, protein bars, snack pieces, or cereal clusters, where the binder comprises a modified wheat protein isolate. Other non-limiting embodiments relate to food compositions comprising a modified wheat protein isolate binder, and at least one of food particulates; powdered food ingredients, such as protein powders; and combinations thereof. In addition, methods for forming the various non-limiting embodiments of the food compositions and the modified wheat protein isolate binder systems are also disclosed.

16 Claims, 4 Drawing Sheets

(56) References Cited

U.S. PATENT DOCUMENTS

| | | |
|---|---|---|
| 2003/0082277 A1 | 5/2003 | Sokhey et al. |
| 2003/0091698 A1 | 5/2003 | Marsland |
| 2003/0113434 A1 | 6/2003 | Marsland |
| 2003/0134023 A1* | 7/2003 | Anfinsen ............ 426/549 |
| 2004/0001910 A1 | 1/2004 | Yu |
| 2004/0043130 A1 | 3/2004 | Thomas et al. |
| 2004/0126477 A1* | 7/2004 | Coleman et al. ............ 426/620 |
| 2005/0013900 A1* | 1/2005 | Dohl et al. ............ 426/35 |
| 2005/0287267 A1 | 12/2005 | Maningat et al. |
| 2006/0088628 A1 | 4/2006 | Dekker et al. |

OTHER PUBLICATIONS

Kobs, Lisa, "Bar Talk" in Food Product Design, Sep. 1999, p. 1-13.*
Douaud, C., "ADM wheat protein ingredient to bind health bars", FoodNavigator USA Website, Jun. 26, 2006, available at http://www.foodnavigator-usa.com/news/ng.asp?n=68659-adm-wheat-protein, last visited Sep. 30, 2006.

* cited by examiner

US 8,551,544 B2

PROTEIN ISOLATE COMPOSITIONS AND USES THEREOF

CROSS REFERENCE TO RELATED APPLICATIONS

This application claims priority to U.S. Provisional Application No. 60/698,802 filed Jul. 13, 2005, the disclosure of which is incorporated in its entirety by reference herein.

BACKGROUND

1. Field of the Technology

The technology of the present disclosure relates to a modified wheat protein isolate and its use in food systems.

2. Background of the Technology

Wheat flour is ideal for bread making since the storage proteins of wheat form a strong, cohesive dough that retains gas bubbles, such as carbon dioxide produced by yeast during rising of bread products, to produce light baked products. The wheat proteins may be isolated from wheat flour by removing starch and albumins/globulins by gently working the dough under a stream of water. After washing, a rubbery ball remains comprising the wheat gluten proteins, which are known as "vital wheat gluten". Traditionally, gluten proteins have been classified into four families according to their solubility: 1) albumins, which are soluble in water or dilute salt solutions and are coagulated by heat; 2) globulins, which are insoluble in pure water but soluble in dilute aqueous salt solutions and insoluble in concentrated aqueous salt solutions; 3) prolamins, which are soluble in aqueous alcohol; and 4) glutelins, which are soluble in dilute acid or bases, detergents, or dissociating or reducing agents, such as urea or 2-mercaptoethanol, respectively.

The prolamins are considered to be unique to the seed of cereals and other grains or grasses. The prolamins have been given different names in different cereals, such as: gliadin in wheat, avenins in oats, zeins in maize, secalins in rye, and hordein in barley. The gliadins and glutenins of wheat are the storage proteins of the wheat endosperm. Gluten can be described as having a bimodal distribution between gliadin and glutenin. Gluten composition is a major factor in determining wheat dough mixing strength and processing characteristics.

Gliadin, or the gliadin fraction of gluten, has a low ionic strength and excellent film forming properties. Gliadin is insoluble in water; however, its solubility may be modified with the addition of a surfactant and/or adjustment of the pH by acidification. Typical acids suitable for solubilizing Gliadin include citric acid, malic acid, lactic acid, oxalic acid, tartaric acid, ascorbic acid, and acetic acid. Gliadin may absorb up to twice its weight of water.

Glutenin, or the glutenin fraction of gluten, is highly elastic and rubbery and is also resistant to shear. Glutenin is insoluble in alcohol and neutral water, however, its solubility may be modified with the addition of a surfactant and/or adjustment of the pH. The protein structure of glutenin is stabilized by interchain disulfide bonds.

Vital wheat gluten is approved by the U.S. Food and Drug Administration as Generally Recognized as Safe (GRAS) under 21 C.F.R. §184.1322 for use as a dough strengthener, formulation aid, nutrient supplement, processing aid, stabilizer and thickener, surface finishing agent, and texturizing agent at levels not to exceed current good manufacturing practice. Vital wheat gluten is defined as a viscoelastic gluten that is extensible when hydrated. As used herein, the term "extensible" means capable of being stretched without tearing.

Through further removal of non-protein constituents, the protein content of vital wheat gluten can be increased. The functional properties of this protein can be modified through the use of acids, reducing agents, phosphates, enzymes, and combinations thereof to convert the proteins to a "wheat protein isolate". The wheat protein isolates have been used in bakery systems for a variety of functions including increasing dough extensibility, decreasing dough mix time, increasing sheeting ability, and increasing protein content, as well as for increasing laminating performance of dough systems. Wheat protein isolates may be added to bread doughs to modify various characteristics, such as rise, dough strength, and dough chewiness. Wheat protein isolates may also be used as an additive to non-wheat flours, such as almond flour, to maintain the gluten-like characteristics, typically associated with wheat flours, in flours that lack gluten.

Food bars, such as, breakfast bars, granola bars, cereal bars, nutrition bars, meal supplements bars, rice cakes, candy bars, protein bars, and energy bars, have become an increasingly popular form of nutrition due, in part, to their small size, portability, and ability to be rapidly consumed. Typically, food bars comprise food particulates and/or powders, and a food-grade binder, which binds bar ingredients into a coherent mass that may be shaped into the desired form. In general, food binders must effectively bind the food ingredient system in such a way that the bar is readily consumable, i.e., exhibit acceptable taste, mouth-feel, texture, density, ease of biting; while still maintaining acceptable shelf life. Common food binders traditionally used in the food industry include corn syrups, molasses, starches, evaporated cane juice, other carbohydrate based binders, egg products such as egg proteins, vital wheat gluten, and glycerin.

While general food-grade binder products are available, there are few products on the market that are suitable for use as binders that do not increase the sweetness of these food systems. In addition, nearly all of these available binders are carbohydrate based and are used in a concentration of greater than 15% by weight.

SUMMARY OF THE INVENTION

Non-limiting embodiments of the present disclosure relate to a protein-based binder system comprising a modified wheat protein isolate and various food articles, as well as compositions formed therefrom. Methods of forming the modified wheat protein isolate binder system and food articles and compositions are also described.

In one non-limiting embodiment, the present disclosure includes a method comprising mixing a wheat protein isolate with water, thus forming a slurry, and placing the slurry on at least a portion of a surface of a food product.

In another non-limiting embodiment, the present disclosure includes a composition consisting essentially of a wheat protein isolate; a compound selected from the group consisting of a humectant, a sweetener, and combinations thereof; and water.

In a further non-limiting embodiment, the present disclosure includes a food composition comprising food particulates and a matrix binding at least a portion of the food particulates together, wherein the matrix comprises a protein isolate.

In still a further non-limiting embodiment, the present disclosure includes a food composition comprising food particulates and a matrix binding at least a portion of the food particulates together, wherein the matrix comprises a wheat protein isolate, water, glycerin and at least one liquid sweetener.

In yet another non-limiting embodiment, the present disclosure includes a system comprising a first composition comprising a protein isolate; and a second composition comprising a compound selected from the group consisting of a humectant, a liquid sweetener, and a combination thereof.

According to certain non-limiting embodiments, the present disclosure includes a food composition comprising: food particulates; and a modified wheat protein isolate binder, wherein the food particulates are bound together with the modified wheat protein isolate binder.

In other non-limiting embodiments, the present disclosure provides a food composition comprising: a protein; and a modified wheat protein isolate binder, wherein the protein is bound together with the modified wheat protein isolate binder.

In still other non-limiting embodiments, the present disclosure includes a food composition comprising: at least one of a protein powder and food particulates; and a modified wheat protein isolate binder, wherein the at least one of a protein powder and food particulates are bound together with the modified wheat protein isolate binder.

In further non-limiting embodiments, the present disclosure provides a protein-based binder for food particulates and powders. The protein-based binder is formed from a modified wheat protein isolate, wherein the modified wheat protein isolate is capable of binding together the food particulates and powders.

In still further non-limiting embodiments, the present disclosure provides a protein-based binder comprising: a modified wheat protein isolate; a humectant; and water. The composition may further comprise a sweetener, which may be a non-nutritive sweetener. The modified wheat protein isolate may comprise from about 5% to about 50% by weight of the binder. The humectant may comprise from about 0% up to about 50% by weight of the binder. The sweetener may comprise from about 0% up to about 50% by weight of the binder. In one non-limiting embodiment, the water may comprise from about 5% to about 60% by weight of the binder. The modified wheat protein isolate of these non-limiting embodiments comprises wheat gluten treated with an acid and a reducing agent, wherein the modified wheat protein isolate has reduced viscoelastic properties compared to a wheat protein isolate that has not been treated with an acid and a reducing agent.

In still other non-limiting embodiments, the present disclosure provides a method of making a food composition. The method comprises: mixing the protein-based binder according to various non-limiting embodiments described herein with at least one additive; adding the mixture to a composition comprising at least one of a protein powder and food particulates; and molding the combined mixture into a desired shape. At least one additive may be selected from the group consisting of dried fruit pieces, a humectant, a fat, a lipid, a colorant, a flavorant, an emulsifier, an acidulant, a sweetener, a vitamin, a mineral, a spice, a fiber, a protein powder, nutraceuticals, sterols, isoflavones, lignans, glucosamine, herbal extracts, hydrocolloids, gums, starches, xanthans, a preservative, legume products, omega-3 enrichments, omega-6 enrichments, a docosahexaenoic acid (DHA) enrichment, and various combinations thereof.

In other non-limiting embodiments, the present disclosure provides a method for making a protein-based binder comprising: mixing about 5% to about 50% by weight of a modified wheat protein isolate, about 0% to about 50% by weight of a humectant, about 0% to about 50% by weight of a non-nutritive sweetener, and about 5% to about 60% by weight of water.

According to further non-limiting embodiments, the present disclosure provides a protein-based binder for binding food particulates and a protein. The protein-based binder comprises: a modified wheat protein isolate; at least one humectant; and water. The modified wheat protein isolate may comprise wheat gluten treated with an acid and a reducing agent, wherein the modified wheat protein isolate has reduced viscoelastic properties compared to a wheat protein isolate that has not been treated with an acid and a reducing agent. The viscoelastic properties of the modified and non-modified wheat protein isolates may be determined using a Mixograph. Food compositions comprising protein-based binders according to these embodiments are also disclosed.

DETAILED DESCRIPTION

Figure 1:
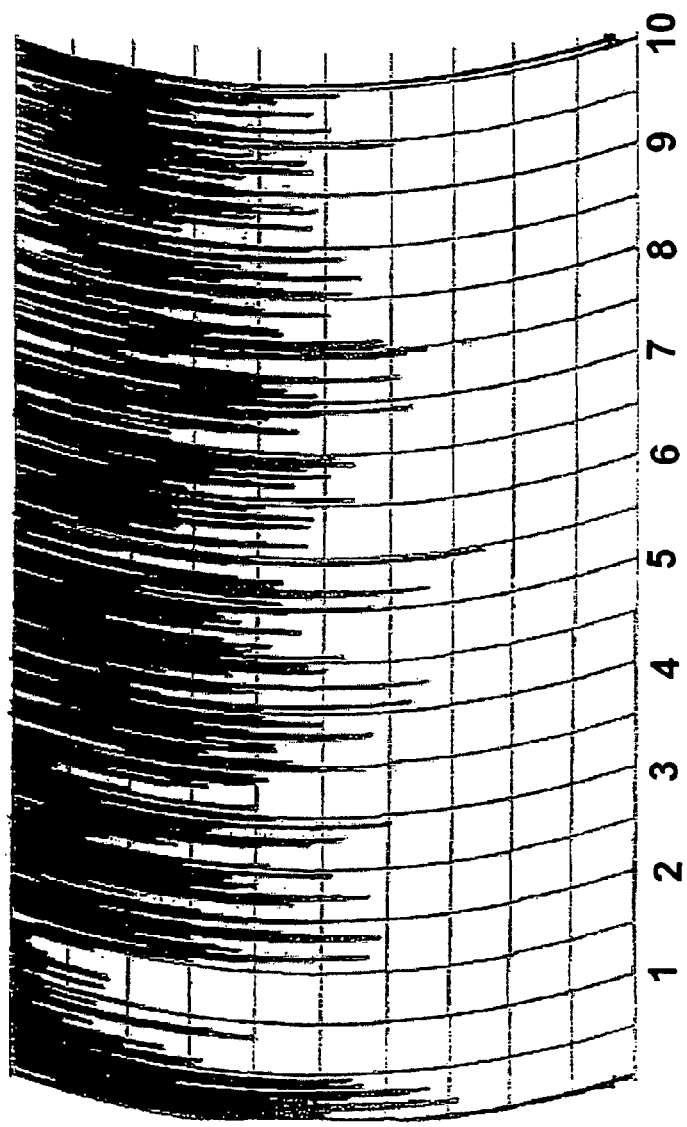
FIG. 1 illustrates a Mixograph of untreated wheat gluten

The various non-limiting embodiments of the present disclosure relate to a nutritive protein-based binder system that may be used for particulate-type or powder-type food systems or combinations of particulate and powder-type food systems, for example, to form nutritive ready-to-eat food bars, protein bars, cereal clusters, and the like, where the binder comprises a modified wheat protein isolate. As used herein, the term "nutritive" includes providing or capable of providing nourishment. Other non-limiting embodiments relate to food compositions comprising a modified wheat protein isolate binder, and at least one of food particulates; powdered food ingredients, such as protein powders; and combinations thereof. According to other non-limiting embodiments, the food bar may comprise a low-carbohydrate food bar that is suitable for low-carbohydrate diets. Other non-limiting embodiments provide a reduced sugar product, a "no-added" sugar product, and a low glycemic index ("GI") product. In addition, methods for forming the various non-limiting embodiments of the food compositions and the modified wheat protein isolate binder system are also disclosed.

Other than the operating examples, or where otherwise indicated, all numbers expressing quantities of ingredients, processing conditions and the like used in the specification and claims are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, inherently contain certain errors, such as, for example, equipment and/or operator error, necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the invention with reference to various exemplary non-limiting embodiments. It is understood, however, that the invention embraces numerous alternative embodiments, which may be accomplished by combining any of the different features, aspects, and embodiments described herein in any combination that one of ordinary skill in the art would find useful.

According to certain non-limiting embodiments, the present disclosure includes methods to reduce or replace the traditional carbohydrate based binders in food systems with a protein based binder/adhesive. The protein based binder/adhesive system comprises a modified wheat protein isolate which may be combined with one or more of humectants, emulsifiers, acidulants, polyols, lipid fractions, additional food proteins, food gums, and other food ingredients, and may be used to hold particulates and/or powders, such as, for example food particulates, protein powders, fibers, and carbohydrate powders, together in an aggregated form, such as, for example, a food bar, or to bind or adhere food particulates to a surface of a food product.

The modified wheat protein isolate of the various non-limiting embodiments may be isolated from vital wheat gluten by further removal of the starch and albumins/globulins by gently working the wheat gluten under a stream of water. After washing, a rubbery ball remains comprising the vital wheat gluten. The wheat gluten may be treated, as described herein, to yield a modified wheat protein isolate that comprises the primary component of the binder systems of the various non-limiting embodiments disclosed herein. The wheat proteins are treated with an acid and a reducing agent, which in certain non-limiting embodiments may further include treating with a phosphate, to yield the modified wheat protein isolate. Treatment with an acid and/or a reducing agent modifies or breaks at least some of the inter- and intra-strand bonds between the individual protein strands of the wheat proteins affording a more relaxed, easier to work with variety of protein. While treatment with acid and a reducing agent is one method of producing the modified wheat protein isolate, other methods of treating the wheat proteins, such as, for example, using an enzyme, such as a protease or a deamidase, to modify or break at least some of the inter- and intra-strand bonds between the wheat protein strands, to yield a modified wheat protein isolate suitable for use in the various non-limiting embodiments of the present disclosure, are also disclosed.

Treating the wheat protein isolate with an acid, for example, but not limited to, an organic acid, such as, for example, citric acid, ascorbic acid, tartaric acid, malic acid, lactic acid, fumaric acid, propionic acid, succinic acid, acetic acid, and oxalic acid, an inorganic acid, such as phosphoric acid, and combinations of organic and/or inorganic acids, may result in deamidation of the gluten proteins of the wheat protein isolate. Without intending to be limited by any particular mechanism, it is generally believed that deamidation of the wheat protein isolate with an acid or enzyme results in deamidation of the primary amides of the glutamine and asparagine residues within the protein strands, thereby breaking or interrupting the inter- and intra-strand hydrogen bonding among the wheat protein isolate peptide strands. The deamidation may result in an increase in charge density on the protein, causing changes in the protein conformation due to electrostatic repulsion and enhanced surface hydrophobicity due to the exposure of hydrophobic residues. Gluten protein solubility may be enhanced, even though surface hydrophobicity may be increased, due to decreased protein-protein interactions.

The wheat protein isolate of the various non-limiting embodiments may also be treated with a reducing agent. Suitable reducing agents include, but are not limited to, sodium metabisulfite, L-cysteine, dithiotheitol ("DTT"), 2-mercaptoethanol, and combinations of any thereof. Without intending to be limited by any particular mechanism, it is believed that the reducing agents may cleave inter- and intra-strand disulfide bonds between cysteine residues within the wheat protein strands. Thus, treatment of the wheat protein isolate with an acid and a reducing agent may modify the tertiary structure of the gluten protein strands resulting in a more soluble protein that exhibits greater extensibility, vitality, and adhesiveness, and reduced viscoelastic properties as compared to unmodified wheat protein isolates. As used herein, the term "viscoelastic" includes a solid or liquid with both viscous and elastic properties. A viscoelastic dough will deform and flow under the influence of an applied shear stress, but when the stress is removed, the dough will slowly recover from at least some of the deformation. The modified wheat protein isolate may be further characterized as a protein isolate having at least 90% protein by weight. The modified wheat protein isolate, as described herein, is suited for use in a protein based binder for food particulates and/or powdered food particle systems. Various non-limiting embodiments of the formulations of the modified wheat protein isolate binder will now be described in detail. As used herein, the term "wheat protein isolate" used in the context of describing the various non-limiting embodiments of the present disclosure includes any of the wheat protein isolates treated according to the various non-limiting embodiments disclosed herein (i.e., "modified" wheat protein isolate), unless it has been specifically noted that the wheat protein isolate has not been treated as described herein (such as, for example an "unmodified" wheat protein isolate).

Figure 2:
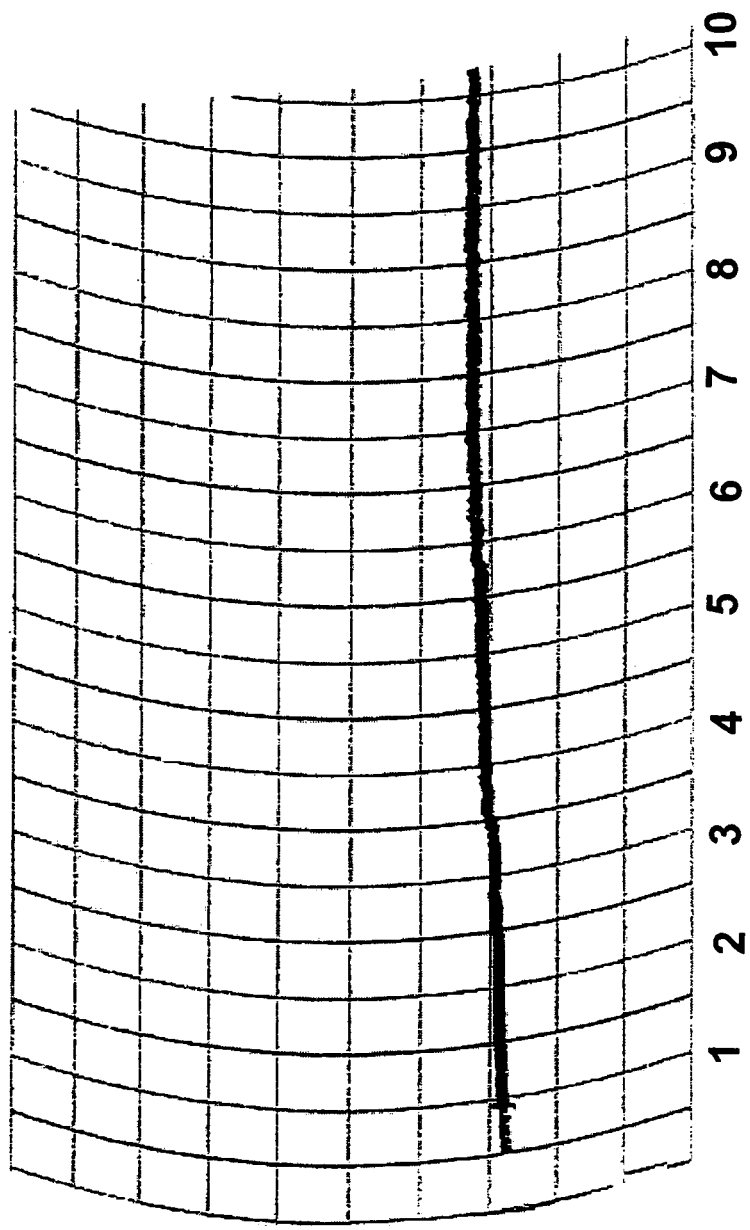
FIG. 2 illustrates a Mixograph of a modified wheat protein isolate treated with an acid and a reducing agent.
Figure 3:
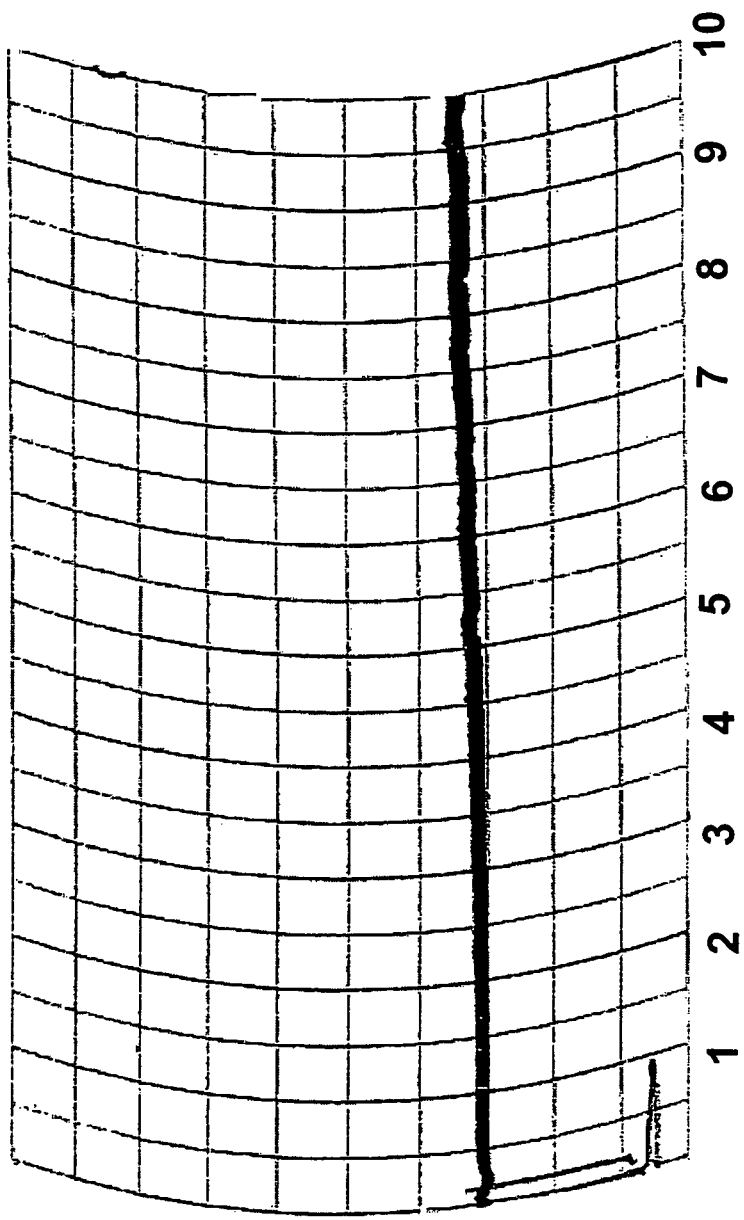
FIG. 3 illustrates a Mixograph of a modified wheat protein isolate treated with an acid, a reducing agent, and a phosphate.

Properties, such as vitality, extensibility, and viscoelasticity, of wheat gluten and various non-limiting embodiments of the modified wheat protein isolates of the present disclosure may be measured with a Mixograph, manufactured by National Manufacturing Co. of Lincoln, Nebr. One example of a Mixograph procedure is as follows. Wheat gluten or the modified wheat protein isolate is placed in the Mixograph bowl, distilled water is added, and the combination mixed until tacky. The Mixograph is started and the results may be graphed on the Mixograph plot. FIG. 1 illustrates a Mixograph of wheat gluten, showing a strong dough with high elasticity and high extensibility. FIG. 2 illustrates a Mixograph of one embodiment of the modified wheat protein isolates of the present disclosure, showing a weaker dough with lower elasticity and extensibility than the Mixograph of FIG. 1. FIG. 3 illustrates a Mixograph of another embodiment of the modified wheat protein isolates of the present disclosure, which has been further modified by the addition of a phosphate, showing a weaker dough with lower elasticity and extensibility than vital wheat gluten, as depicted in FIG. 1. It should be noted that other methods and apparatus may be known by those skilled in the art for measuring properties of dough, such as properties of the modified wheat protein isolates, and the use of the Mixograph method, as described herein, should not be viewed as limiting herein.

In certain non-limiting embodiments, the nutritive protein-based binder system may comprise: a modified wheat protein isolate; a humectant, such as, for example, glycerin; a sweetener, for example, a non-nutritive sweetener, such as, sorbitol; other plant or animal based proteins, such as, for example, soy protein or whey protein; and water. According to certain non-limiting embodiments, the protein-based binder may comprise: modified wheat protein isolate from about 5% to about 50% by weight; a humectant, such as, for example, glycerin, from about 0% up to about 50% by weight; a sweetener, such as, a non-nutritive sweetener, for example, sorbitol, from about 0% up to about 50% by weight; and water from about 5% to about 60%. Certain non-limiting embodiments may comprise modified wheat protein isolate from about 5% to about 50% by weight; a humectant, such as, for example, glycerin, from about 0% up to about 50% by weight; a sweetener, such as, a non-nutritive sweetener, for example, sorbitol, from about 0% up to about 50% by weight; and water from about 5% to about 60%, wherein the combined amount of the humectant and the non-nutritive sweetener is greater than 5%. According to other non-limiting embodiments, the ratio of the humectant to non-nutritive sweetener is from 50:50 to 90:10, and may be dependent on the desired sweetness and/or chewiness.

According to other non-limiting embodiments, the protein-based binder may comprise: modified wheat protein isolate from about 5% to about 50% by weight; glycerin from about 5% up to about 50% by weight; sorbitol from about 5% up to about 50% by weight; and water from about 5% to about 60%. According to the various non-limiting embodiments, the modified wheat protein isolate may be modified by treatment with an acid and a reducing agent, which in certain non-limiting embodiments may further include a phosphate, as described above, such that the modified wheat protein isolate has reduced viscoelastic properties, compared to a wheat protein isolate that has not been treated with an acid and a reducing agent.

The combination of the modified wheat protein isolate, humectant, sweetener, and water may be manipulated and altered to achieve particular binding and adhesive qualities, and other characteristics desired in the finished food composition, such as, for example, cohesiveness, adhesiveness, springiness, chewiness, crunchiness, mouth feel, stickiness, hardness, brittleness, softness, stabilization, texturization, and pliability. For example, in one non-limiting embodiment, the modified wheat protein isolate binder system may comprise a hard, brittle, crunchy adhesive upon drying, for example, an adhesive suitable for the manufacture of cereal clusters or crunchy granola-type bar. The binder according to these non-limiting embodiments may have a composition comprising: modified wheat protein isolate from about 25% to about 50% by weight; a humectant, such as, for example, glycerin, from about 20% to about 40% by weight; a sweetener, such as, for example, the non-nutritive sweetener, sorbitol, from about 0% up to about 20% by weight; and water from about 20% to about 50%. In another non-limiting embodiment, the modified wheat protein isolate binder system may comprise a soft and pliable adhesive, for example, an adhesive suitable for the manufacture of chewy fruit or granola-type bars, or particulate and/or powdered nutritional bars. The binder according to these non-limiting embodiments may have a composition comprising: modified wheat protein isolate from about 15% to about 35% by weight; a humectant, such as, for example, glycerin, from about 30% to about 55% by weight; a sweetener, such as, for example, the non-nutritive sweetener, sorbitol, from about 5% to about 25% by weight; and water from about 10% to about 45%. Other food ingredients, such as, for example, emulsifiers, lipids, other food proteins, and/or acidulants may be added to further modify the adhesive characteristics, binding characteristics, texture characteristics, and/or stabilization characteristics of the modified wheat protein isolate binding system.

According to certain non-limiting embodiments, the compositions of the present disclosure may exhibit enhanced binding characteristics when an additional food ingredient, such as, an additional food protein, which may be in a powdered or other form, is added to the binder system. As used herein, the term "food protein" includes an edible protein material derived from a plant or animal source. Certain non-limiting embodiments of the binder system may comprise: modified wheat protein isolate from about 5% to about 55% by weight; a humectant, such as, glycerin, from about 0% up to about 50% by weight; a sweetener, such as, a non-nutritive sweetener, for example, sorbitol, from about 0% up to about 50% by weight; water from about 5% to about 60%; and an additional food protein from about 0% up to about 30% by weight. According to other non-limiting embodiments, the binder composition may comprise from about 5% to about 15% by weight of another food protein, which may be a plant- or animal-based food protein. Many food proteins may be suitable for use in the various non-limiting embodiments of the binder systems which comprise another food protein. For example, the following additional food proteins may be used as a component in certain embodiments of the binder system: milk protein, caseinate, whey protein, buttermilk solids, milk powders, egg protein, gelatin, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and any combinations thereof.

According to certain non-limiting embodiments, the present disclosure includes a food composition comprising: food particulates; and a modified wheat protein isolate binder, wherein the food particulates are bound together with the modified wheat protein isolate binder. The food particulates may comprise any edible food particulates known in the art, including, but not limited to, one or more of cereal grains, cereal flakes, crisped rice, puffed rice, oats, crisped oats, granola, wheat cereals, protein nuggets, textured soy flour, textured soy protein concentrate, other texturized protein ingredients, flavored nuggets, cookie pieces, cracker pieces, pretzel pieces, crisps, soy grits, nuts, fruit pieces, dried fruit pieces, corn cereals, seeds, popcorn, yogurt pieces, tortilla chips, potato chips, corn chips, chip particulates, and combinations of any thereof. According to certain non-limiting embodiments, the food composition may further comprise at least one of dried fruit pieces, a humectant, a fat, a lipid, a colorant, a flavorant, an emulsifier (i.e., lecithin), an acidulant (i.e., citric acid, ascorbic acid, or lactic acid), a sweetener (i.e., sorbitol or other nutritive or non-nutritive sweetener), a vitamin, a mineral, a spice, a fiber (i.e., a soluble, non-digestible fiber, such as, inulin and/or FIBERSOL® digestion resistant maltodextrin, a registered trademark of Matsutani Corp., Japan), a protein powder (i.e., an oil seed protein powder or edible bean powder), nutraceutical ingredients (including, but not limited to, sterols, isoflavones, lignans, glucosamine, and/or herbal extracts), xanthan, gums, hydrocolloids, starches, preservatives, legume products, omega-3 enrichments, omega-6 enrichments, a docosahexaenoic acid (DHA) enrichment, and combinations of any thereof. The food composition may have the form of a ready-to-eat food bar, a snack piece, or a cereal cluster, as well as other possible forms.

According to another non-limiting embodiment, the food composition comprises: a protein; and a modified wheat protein isolate binder, wherein the protein is bound together with the modified wheat protein isolate binder. The protein may comprise any edible protein known in the art, including, but not limited to, animal-based proteins, such as, for example, milk protein, caseinate, whey protein isolate, buttermilk solids, milk powders, egg protein, and gelatin; and plant-based proteins, such as, for example, soy protein isolate, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof. According to certain non-limiting embodiments, the food composition may further comprise at least one of dried fruit pieces, an additional humectant, a fat, a lipid, a colorant, a flavorant, an emulsifier (i.e., lecithin), an acidulant (i.e., citric acid, ascorbic acid, or lactic acid), a sweetener (i.e., sorbitol or other nutritive or non-nutritive sweetener), a vitamin, a mineral, a spice, a fiber (i.e., a soluble, non-digestible fiber, such as, inulin and/or FIBERSOL® digestion resistant maltodextrin), a protein powder (i.e., an oil seed protein powder or edible bean powder), nutraceutical ingredients (including, but not limited to, sterols, isoflavones, lignans, glucosamine, and/or herbal extracts), xanthan, gums, hydrocolloids, starches, preservatives, legume products, omega-3 enrichments, omega-6 enrichments, a docosahexaenoic acid (DHA) enrichment, and combinations of any thereof. The food composition may have the form of a ready-to-eat protein bar or snack piece, as well as other possible forms.

According to another non-limiting embodiment, the food composition comprises: a protein; food particulates; and a modified wheat protein isolate binder, wherein the protein and the food particulates are at least partially coated with, and in certain embodiments, bound together with the modified wheat protein isolate binder. The protein may comprise any edible protein (such as, for example, a protein powder) known in the art, including, but not limited to, animal-based proteins, such as, for example, milk protein, caseinate, whey protein, buttermilk solids, milk powders, egg protein, and gelatin; and plant-based proteins, such as, for example, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof. The food particulates may comprise any edible food particulates known in the art, including, but not limited to, one or more of cereal grains, cereal flakes, crisped rice, puffed rice, oats, crisped oats, granola, wheat cereals, protein nuggets, textured soy flour, textured soy protein concentrate, other texturized protein ingredients, flavored nuggets, cookie pieces, cracker pieces, pretzel pieces, crisps, soy grits, nuts, fruit pieces, dried fruit pieces, corn cereals, seeds, popcorn, yogurt pieces, tortilla chips, potato chips, corn chips, chip particulates, and combinations of any thereof. According to certain non-limiting embodiments, the food composition may further comprise at least one of dried fruit pieces, a humectant, a fat, a lipid, a colorant, a flavorant, an emulsifier (i.e., lecithin), an acidulant (i.e., citric acid or lactic acid), a sweetener (i.e., sorbitol or other non-nutritive sweetener), a vitamin, a mineral, a spice, a fiber (i.e., a soluble, non-digestible fiber, such as, inulin and/or FIBERSOL® digestion resistant maltodextrin), a protein powder (i.e., an oil seed protein powder or edible bean powder), nutraceutical ingredients (including, but not limited to, sterols, isoflavones, lignans, glucosamine, and/or herbal extracts), xanthan, gums hydrocolloids, starches, preservatives, legume products, omega-3 enrichments, omega-6 enrichments, a docosahexaenoic acid (DHA) enrichment, and combinations of any thereof. The food composition may have the form of a ready-to-eat food bar, such as a ready-to-eat protein bar, snack piece, or a cereal cluster.

According to another non-limiting embodiment, the compositions of the present disclosure may comprise a food composition, which may be, for example, a low-carbohydrate food composition, a reduced sugar food composition, a "no-added" sugar composition, and/or a low glycemic index composition. The food compositions according to these embodiments comprises: at least one of a protein and food particulates; and a modified wheat protein isolate binder, wherein the at least one of the protein and the food particulates are bound together with the modified wheat protein isolate binder. As used herein, the term "low-carbohydrate" includes a reduced carbohydrate content, such as less than 20% by weight. As used herein, the term "reduced sugar" includes a food composition that has at least a 25% reduction in the amount of sugar as compared to a comparable standard product on the market. As used herein, the term "no-added sugar" includes that no additional caloric sweetener is added to the composition. As used herein, the term "low glycemic index" includes a composition that has a glycemic index ("GI") of less than or equal to 55% as compared to a standard reference food (i.e., white bread or glucose) which has a GI value set at 100%.

In certain non-limiting embodiments where the food composition comprises a protein, the protein may be any edible protein known in the art (such as, for example, a protein powder), such as, but not limited to, animal-based proteins, such as, for example, milk protein, caseinate, whey protein, buttermilk solids, milk powders, egg protein, and gelatin; and plant-based proteins, such as, for example, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof. In the various non-limiting embodiments where the food composition comprises food particulates, the food particulates may be any edible food particulates known in the art, for example, but not limited to, one or more of cereal grains, cereal flakes, crisped rice, puffed rice, oats, crisped oats, granola, wheat cereals, protein nuggets, textured soy flour, textured soy protein concentrate, other texturized protein ingredients, flavored nuggets, cookie pieces, cracker pieces, pretzel pieces, crisps, soy grits, nuts, fruit pieces, dried fruit pieces, corn cereals, seeds, popcorn, yogurt pieces, tortilla chips, potato chips, corn chips, chip particulates, and combinations of any thereof. According to certain non-limiting embodiments, the low-carbohydrate food bar may further comprise at least one of dried fruit pieces, a humectant, a fat, a lipid, a colorant, a flavorant, an emulsifier (i.e., lecithin), an acidulant (i.e., citric acid or lactic acid), a sweetener (i.e., sorbitol or other nutritive or non-nutritive sweetener), a vitamin, a mineral, a spice, a fiber (i.e., a soluble, non-digestible fiber such as FIBER-SOL® digestion resistant maltodextrin), a protein powder (i.e., an oil seed protein powder or edible bean powder), nutraceutical ingredients (including, but not limited to, sterols, isoflavones, lignans, glucosamine, and/or herbal extracts), xanthan, gums, hydrocolloids, starches, preservatives, legume products, omega-3 enrichments, omega-6 enrichments, a docosahexaenoic acid (DHA) enrichment, and combinations of any thereof.

According to certain non-limiting embodiments, the food composition comprises a low-carbohydrate food composition, wherein the low-carbohydrate food composition comprises less than 20% carbohydrates by weight. According to other non-limiting embodiments, the food composition comprises a reduced sugar food composition, wherein the reduced sugar food composition contains at least 25% less sugar than a comparable product comprising a standard non-protein binder system. According to certain non-limiting embodiments, the food composition may include a composition with partial sugar replacement. That is, according to various embodiments, the binder systems, as described herein, may be used in place of at least a portion of the sugar used in a food composition formulation that commercially includes sugar, for example, but not limited to, by replacing at least a portion of the sugar used for binding purposes. In certain other non-limiting embodiments, the food composition comprises a no added sugar food composition, wherein the food composition has no additional sugar added during the formulation process. In other non-limiting embodiments, the food composition comprises a low glycemic index composition, wherein the composition has a GI of less than or equal to 55% compared to a standard reference food, such as, for example, white bread or glucose, which has a GI value set at 100%.

The food compositions, according to the various non-limiting embodiments disclosed herein, may comprise a variety of formulations, such as, for example, food bars, breakfast bars, granola bars, cereal bars, nutrition bars, meal supplement bars, rice cakes, candy bars and treats, protein bars, energy bars, clusters, cereal clusters, snack pieces, and the like. According to certain non-limiting embodiments, the various formulations of the food compositions of the present disclosure may comprise from about 10% to about 40% by weight of the modified wheat protein isolate binder and about 60% to about 90% by weight of the food particulates and/or powders. In certain non-limiting embodiments, the food composition may comprise from about 15% to about 40% by weight of the modified wheat protein isolate binder and about 60% to about 85% by weight of the food particulates and/or powders, for example, when the food composition is a food bar or protein bar. In other non-limiting embodiments, for example when the food composition is a cereal cluster, the food composition may comprise from about 5% to about 25% by weight of the modified wheat protein isolate binder and about 60% to about 90% by weight of the food particulates and/or powders.

Figure 4:
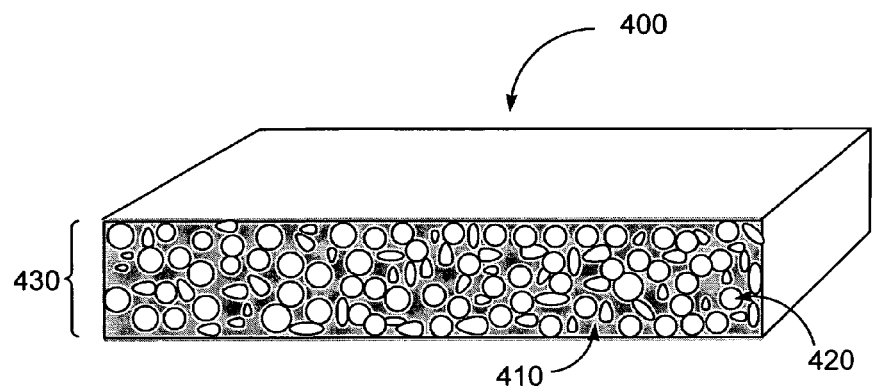
FIG. 4 illustrates a cross-section of a food bar according to one non-limiting embodiment disclosed herein.

FIG. 4 illustrates a cross-section 430 of a food composition comprising a food bar 400 according to one non-limiting embodiment of the present disclosure. Bar 400 comprises food particulates 420, as described herein, that may be bound together to form the bar 400 by a matrix 410 comprising at least one of a protein isolate, a humectant, a sweetener, and water, according to various non-limiting embodiments disclosed herein.

According to certain non-limiting embodiments of the various food compositions described above, the modified wheat protein isolate binder comprises a combination of a modified wheat protein isolate; a humectant, such as, for example, glycerin; a sweetener, such as, for example, a non-nutritive sweetener; and water. For example, in one non-limiting embodiment, the binder comprises a modified wheat protein isolate from about 5% to about 50% by weight; the humectant, glycerin, from about 0% up to about 50% by weight; the non-nutritive sweetener, sorbitol from about 0% up to about 50% by weight; and water from about 5% to about 60%. As described in greater detail above, the composition of the various components of the wheat protein isolate binder may be manipulated within the ranges disclosed above to provide desired characteristics, such as, but not limited to, cohesiveness, adhesiveness, springiness, chewiness, crunchiness, mouth feel, stickiness, hardness, brittleness, softness, and pliability.

According to certain non-limiting embodiments, the various food compositions and binder systems described herein may further comprise a sweetener, the sweetener may be a "nutritive sweetener", for example, at least one carbohydrate, for example, a sugar (or carbohydrate) such as, but not limited to, glucose, sucrose, fructose, crystalline fructose, maltose, lactose, brown sugar, confectionary sugar, granular sugar, liquid sugar, invert sugar, corn syrups, high-fructose corn syrup, dextrose, maltodextrins, honey, molasses, evaporated cane juice, rice syrup, and combinations thereof. In other non-limiting embodiments, the sweetener may be at least one low-calorie or "non-nutritive" sweetener, such as, for example, sucralose, acesulfame potassium, aspartame, saccharine, neotane, sorbitol (either liquid or crystalline), mannitol, lactitol, isomalt, xylitol, maltitol, and hydrogenated corn syrup. As used herein, the term "low-calorie sweetener" includes sweeteners that have reduced calories compared to a traditional sugar based sweetener, such as sucrose or corn syrup.

The present disclosure also contemplates a protein-based binder for food particulates and/or powders, such as, for example, protein powders, as described herein. The protein-based binder may be formed from a modified wheat protein isolate, as generally described herein. According to the various non-limiting embodiments of the protein-based binder for food particulates and/or powders, the modified wheat protein isolate may be employed to bind together the food particulates and/or powders. The protein-based binder for food particulates and/or powders may comprise from about 5% to about 50% by weight of the modified wheat protein isolate. In certain non-limiting embodiments, the protein-based binder for food particulates and/or powders may further comprise at least one of a humectant, such as, glycerin; a non-nutritive sweetener, for example, a sugar alcohol, such as, sorbitol; additional plant- or animal-based food proteins, such as, but not limited to, soy protein isolate, or whey protein isolate; and water.

According to other non-limiting embodiments, the wheat protein isolates and binder systems described herein may be used as a coating composition or tack coating composition for binding food or other edible particulates to the surface of a food product. In one non-limiting embodiment, the coating or tack coating composition may comprise the modified wheat protein isolate, a sweetener (such as, for example, sugar or other nutritive or non-nutritive sweetener), and water. According to other non-limiting embodiments, the coating composition may further comprise one or more other ingredients selected from the group consisting of baking soda, a vegetable oil, maltodextrin, and combinations of any thereof.

Figure 5:
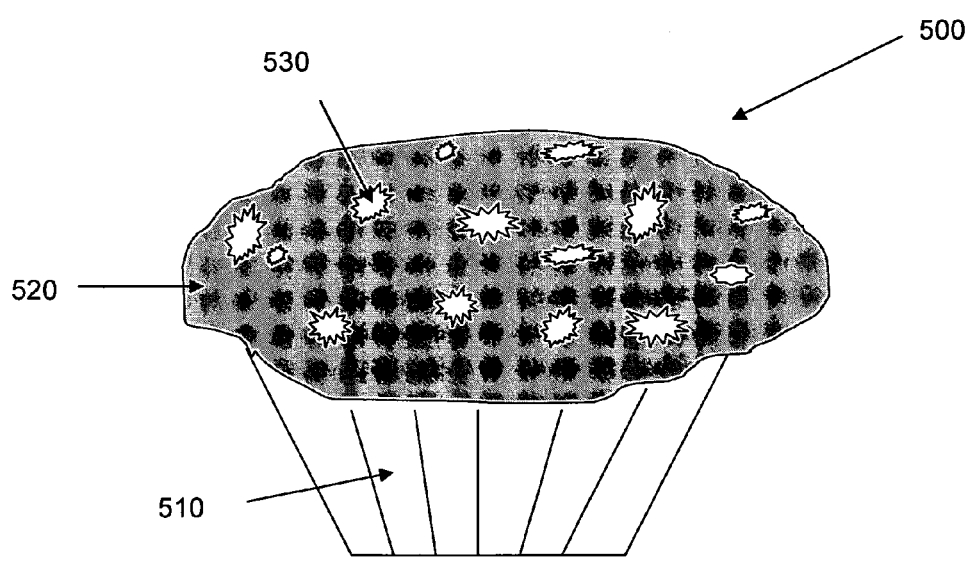
FIG. 5 illustrates a food product having food particles adhered to a surface thereof by a coating according to one non-limiting embodiment disclosed herein.

FIG. 5 illustrates one non-limiting embodiment of a coating on the surface of a food product 500. The food product 500 may comprise a muffin having a first surface 510 without the coating and a second surface with the coating 520 applied thereto. The coating may comprise at least one of a protein isolate, a humectant, a sweetener, and water, according to various non-limiting embodiments disclosed herein. In another embodiment, food particles 530 may be adhered to the second surface of food product 500 with the coating 520, such as, by placing the food particles 530 in contact with coating 520.

In one non-limiting embodiment, a coating composition of the present description may be used in a manner similar to a sugar coating, such as, for example, for coating a frosted type cereal. The components of the coating composition may be mixed to form a sprayable slurry, which may be sprayed onto a surface of a food product, such as, for example, cereal flakes, other cereal pieces, or any other food product. In one non-limiting embodiment, the tack coating, the tack coating composition may be sprayed onto at least a portion of a surface of a food product, optionally allowed to dry, and contacted with food particles or other edible particles, such that the food particles or other edible particles may be adhered to the surface of the food product.

In other non-limiting embodiments, the compositions and methods disclosed herein may be used as stabilizing agents for food products. According to other non-limiting embodiments, the compositions and methods disclosed herein may be used as texturizing agents for food products. For example, in one non-limiting embodiment, the compositions comprising the modified wheat protein isolate disclosed herein may be used to improve properties of food products, such as, for example, clusters and cereal pieces. In another non-limiting embodiment, compositions comprising the modified wheat protein isolate may be used to improve the firmness of clusters and/or cereal pieces. According to yet another non-limiting embodiment, the firmness of the food product may be increased by forming a film comprising the wheat protein isolate compositions described herein on at least a portion of the surface of the food product.

In certain non-limiting embodiments of the protein-based binder for binding food particulates and/or a protein (such as, a protein powder), the binder may comprise: a modified wheat protein isolate comprising wheat gluten treated with an acid and a reducing agent, wherein the modified wheat protein isolate has reduced viscoelastic properties compared to a wheat protein isolate that has not been treated with an acid and a reducing agent (as described herein), as determined with a Mixograph (see, e.g., FIG. 1 with FIGS. 2 and 3); at least one humectant; and water. According to certain non-limiting embodiments, the protein-based binder comprises about 5% to about 50% by weight of the modified wheat protein isolate; about 0% to about 50% by weight of the at least one humectant; and about 5% to about 60% by weight of water. In certain non-limiting embodiments, the protein-based binder may further comprise at least one of an emulsifier, an acidulant, a polyol, a lipid fraction, an additional food protein, and a food gum. According to certain embodiments, at least one humectant is selected from the group consisting of glycerin, sorbitol, mannitol, lactitol, isomalt, xylitol, maltitol, hydrogenated corn syrup, and various combinations thereof. The various non-limiting embodiments of the present disclosure also contemplate a food composition comprising the protein-based binder as described herein above. In certain non-limiting embodiments, the food composition may further comprise at least one of dried fruit pieces, a fat, a lipid, a colorant, a flavorant, an emulsifier, an acidulant, a sweetener, a vitamin, a mineral, a spice, a fiber, a protein powder, a nutraceutical ingredient, xanthan, gums, hydrocolloids, starches, preservatives, legume products, omega-3 enrichments, omega-6 enrichments, a docosahexaenoic acid (DHA) enrichment, and combinations thereof.

According to other non-limiting embodiments, the present disclosure includes a composition comprising a wheat protein isolate, a humectant, and water. In one non-limiting embodiment, the humectant may be glycerin. In other non-limiting embodiments, the composition may further comprise an additional protein selected from the group consisting of: animal-based proteins, such as, for example, milk protein, caseinate, whey protein, buttermilk solids, milk powders, egg protein, and gelatin; and plant-based proteins, such as, for example, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof. In yet another non-limiting embodiment, the composition may further comprise a sweetener. The sweetener may be a nutritive or non-nutritive sweetener, such as any of the sweeteners discussed herein. In one embodiment, the sweetener may be sorbitol. In another embodiment, the composition may comprise wheat protein isolate from 5% to 50% by weight of the composition; a humectant from 0.01% to 50% by weight of the composition; a sweetener from 0.01% to 50% by weight of the composition; and water from 5% to 60% by weight of the composition.

Still other non-limiting embodiments of the present disclosure describe food products comprising any of the compositions described herein. For example, according to one non-limiting embodiment, the food product may comprise a composition comprising a wheat protein isolate, a humectant, and water. In certain non-limiting embodiments, the food product may be selected from the group consisting of food bars, breakfast bars, granola bars, clusters, cereal bars, nutrition bars, meal supplement bars, rice cakes, candy bars and treats, protein bars, energy bars, cereal clusters, and snack pieces. According to other non-limiting embodiments, the food products described herein may further comprise one or more food particulates selected from the group consisting of cereal grains, cereal flakes, crisped rice, puffed rice, oats, crisped oats, granola, wheat cereals, protein nuggets, textured soy flour, textured soy protein concentrate, other texturized protein ingredients, flavored nuggets, cookie pieces, cracker pieces, pretzel pieces, crisps, soy grits, nuts, fruit pieces, dried fruit pieces, corn cereals, seeds, popcorn, yogurt pieces, tortilla chips, potato chips, corn chips, chip particulates, and combinations of any thereof. The food product may further comprise one or more ingredient selected from the group consisting of a fat, a lipid, a colorant, a flavorant, an emulsifier (i.e., lecithin), an acidulant (i.e., citric acid or lactic acid), a sweetener (i.e., sorbitol or other nutritive or non-nutritive sweetener), a vitamin, a mineral, a spice, a fiber (i.e., a soluble, non-digestible fiber, such as, inulin and/or FIBERSOL® digestion resistant maltodextrin), a protein powder (i.e., an oil seed protein powder or edible bean powder), nutraceutical ingredients (including, but not limited to, sterols, isoflavones, lignans, glucosamine, and/or herbal extracts), xanthan, gums, hydrocolloids, starches, preservatives, legume products, omega-3 enrichments, omega-6 enrichments, a docosahexaenoic acid (DHA) enrichment, and combinations of any thereof.

The present disclosure also includes non-limiting embodiments directed to a composition capable of binding food particulates, protein powders, and combinations thereof to each other or other food products. In one non-limiting embodiment, the compositions may comprise a modified wheat protein isolate comprising wheat gluten treated with an acid and a reducing agent; at least one humectant; and water. The modified wheat protein isolate may have reduced viscoelastic properties as compared to a wheat protein isolate that has not been treated with an acid and a reducing agent. According to other non-limiting embodiments, the composition may further comprise at least one of an emulsifier, an acidulant, a polyol, a lipid fraction, an additional food protein, and a food gum. According to certain non-limiting embodiments, the at least one humectant may selected from the group consisting of glycerin, sorbitol, mannitol, lactitol, isomalt, xylitol, maltitol, hydrogenated corn syrup, and combinations of any thereof.

Still other non-limiting embodiments of the present disclosure include a composition comprising a wheat protein isolate, glycerin, and sorbitol. According to certain non-limiting embodiments, the composition may further comprise water.

According to certain non-limiting embodiments, the compositions disclosed herein may be in the form of a system containing at least two compositions, such as, for example, a dry composition and a liquid composition. According to one non-limiting embodiment, the system may comprise a first composition comprising a wheat protein isolate and a second composition comprising a humectant. In one non-limiting embodiment, the humectant may be glycerin. The first composition may comprise the dry, solid, and/or powdered components of the system and the second composition may comprise the liquid, tacky, and/or wet components of the system. In some non-limiting embodiments, the first composition may further comprise an additional protein, such as, for example, animal-based proteins, such as, for example, milk protein, caseinate, whey protein, buttermilk solids, milk powders, egg protein, and gelatin; and plant-based proteins, such as, for example, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof. In certain embodiments, the additional protein may be a powdered protein. In other non-limiting embodiments, the second composition may also comprise a sweetener, such as, a liquid sweetener, which in one embodiments may include a sweetener comprising sorbitol.

According to other non-limiting embodiments, the system may comprise a first composition and a second composition, which may be "dry" and "wet" components, respectively. The system may further comprise containers for separately containing the first composition and second composition, respectively. For example, according to one non-limiting embodiments, the system may comprise a first container configured for containing the first composition, for example, the dry components; and a second container configured for containing the second composition, for example, the liquid or wet components. The containers may further be configured for shipping and may be shipped together (i.e., in a package) or separately (i.e., individually) to an end user. When desired, the end user may mix or incorporate the first composition and the second composition to form any of the various embodiments of the binding or coating compositions described herein. The resulting composition may be incorporated into a food product as set forth herein. In another non-limiting embodiment, the system may further comprise indicia associated therewith for directing a user of the system on how to incorporate the first composition and the second composition into a food product.

The present disclosure also contemplates various non-limiting methods for making a food composition which may be a food composition according to the various embodiments of the compositions described herein. The methods may comprise: mixing one of the various embodiments of the nutritive modified wheat protein isolate based binder, as described herein, with at least one additive selected from the group consisting of dried fruit pieces, a humectant, a fat, a lipid, a colorant, a flavorant, an emulsifier (i.e., lecithin), an acidulant (i.e., citric acid or lactic acid), a sweetener (i.e., sorbitol or other nutritive or non-nutritive sweetener), a vitamin, a mineral, a spice, a fiber (i.e., a soluble, non-digestible fiber, such as, inulin and/or FIBERSOL® digestion resistant maltodextrin), a protein powder (i.e., an oil seed protein powder or edible bean powder), nutraceutical ingredients (including, but not limited to, sterols, isoflavones, lignans, glucosamine, and/or herbal extracts), xanthan, gums, hydrocolloids, starches, preservatives, legume products, omega-3 enrichments, omega-6 enrichments, a docosahexaenoic acid (DHA) enrichment, and combinations of any thereof; adding the mixture to a composition comprising at least one of a protein and food particulates; and molding the combined mixture into a desired shape. According to certain non-limiting embodiments where the method includes adding the mixture to a protein, the protein may be any edible protein known in the art, including, but not limited to, animal-based proteins, such as, for example, milk protein, caseinate, whey protein, buttermilk solids, milk powders, egg protein, and gelatin; and plant-based proteins, such as, for example, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof. According to certain non-limiting embodiments where the method includes adding the mixture to food particulates, the food particulates may be one or more of cereal grains, cereal flakes, crisped rice, puffed rice, oats, crisped oats, granola, tortilla chips, potato chips, corn chips, chip particulates, wheat cereals, protein nuggets, textured soy flour, textured soy protein concentrate, other texturized protein ingredients, flavored nuggets, cookie pieces, cracker pieces, pretzel pieces, crisps, soy grits, nuts, fruit pieces, dried fruit pieces, corn cereals, seeds, popcorn, yogurt pieces, and combinations of any thereof. One skilled in the art will understand that the order of the various steps within the methods disclosed herein may be rearranged while still affording a method within the scope and spirit of the present disclosure.

Other methods for making a food composition may include using the system comprising the first composition and the second composition as described herein. In one non-limiting embodiment, the method may comprise mixing or incorporating the first composition (i.e., the "dry" components") and the second composition (i.e., the "wet" components), along with other components, such as, for example, edible proteins, food particulates, additives, and the like, as described herein, to make the food composition.

According to other non-limiting embodiments, the present disclosure describes a process for producing a food composition. The process may comprise isolating a wheat protein isolate or obtaining a wheat protein isolate from wheat gluten (as described herein), isolating a glycerin or obtaining a glycerin as a by-product of biodiesel production, and incorporating the wheat protein isolate and the glycerin in to a food compositions. According to another non-limiting embodiment, the process may further comprise isolating sorbitol or obtaining sorbitol from fructose, glucose, or a combination thereof, and incorporating the sorbitol into the food composition. One non-limiting method for the production of a biodiesel which provides a glycerin by-product suitable for use in the various non-limiting embodiments of the present disclosure may be found in U.S. Patent Application Publication No. 2005/0204612, the disclosure of which is incorporated in its entirety by reference herein. One method for isolating or obtaining sorbitol suitable for use in the various non-limiting embodiments disclosed herein may include converting glucose to sorbitol using a catalytic hydrogenation reaction of the glucose with a catalyst, such as, for example, a Raney nickel catalyst.

Other methods within the scope of the present disclosure include methods of making the various non-limiting embodiments of the modified wheat protein isolate based binders as described herein. In one non-limiting example, the method comprises mixing about 5% to about 50% by weight of a modified wheat protein isolate, about 0% to about 50% by weight of glycerin, about 0% to about 50% by weight of sorbitol, and about 5% to about 60% by weight of water. According to another non-limiting embodiment, wherein the binder may be a crunchy, hard binder, the method comprises mixing about 25% to about 50% by weight of the modified wheat protein isolate, 20% to about 40% by weight of glycerin, about 0% to about 20% by weight of sorbitol, and about 20% to about 50% by weight of water. According to still another non-limiting embodiment, wherein the binder may be a chewy, soft binder, the method comprises mixing about 15% to about 35% by weight of the modified wheat protein isolate, 30% to about 55% by weight of glycerin, 5% to about 25% by weight of sorbitol, and about 10% to about 45% by weight of water.

According to other non-limiting embodiments, the present disclosure describes methods for forming a coating or tack coating on a surface of a food product using the modified wheat protein isolate described herein. According to one non-limiting embodiment, a method for forming a coating, such as, a frosted-type coating on a cereal, may comprise mixing a composition comprising the modified wheat protein isolate, a sweetener (such as, sugar or other nutritive or non-nutritive sweetener) and water, to form a sprayable slurry; and spraying the slurry onto at least a portion of the surface of a cereal flake or cereal piece. In other non-limiting embodiments, the coating composition may further comprise one or more other ingredients selected from the group consisting of baking soda, a vegetable oil, maltodextrin, and combinations of any thereof.

The following examples illustrate various non-limiting embodiments of the compositions within the present disclosure and are not restrictive of the invention as otherwise described or claimed herein.

EXAMPLES

Example 1

Crunchy Binder System

This Example illustrates a formulation of a binder system comprising a modified wheat protein isolate that produces a hard, crunchy-type binder upon drying. This binder system can be used as a binder, for example, in the manufacture of cereal clusters and/or crunchy granola-type bars. The composition of this binder system is presented in Table 1.

TABLE 1

Formulation of Crunchy Binder System

| Component | Percent (by weight) |
| --- | --- |
| Modified wheat protein isolate | 30% |
| Glycerin | 30% |
| Sorbitol | 5% |
| Water | 35% |
| Total | 100% |

Example 2

Chewy Binder System

This Example illustrates a formulation of a system comprising a modified wheat protein isolate that produces a soft, chewy, pliable-type binder. This binder system can be used as a binder, for example, in the manufacture of chewy granola-type bars, and particulate and/or powdered nutritional bars. The composition of this binder system is presented in Table 2.

TABLE 2

Formulation of Chewy Binder System

| Component | Percent (by weight) |
| --- | --- |
| Modified wheat protein isolate | 25% |
| Glycerin | 40% |
| Sorbitol | 5% |
| Water | 30% |
| Total | 100% |

Example 3

Binder System Containing a Food Protein

This Example illustrates a formulation of a system comprising a modified wheat protein isolate, glycerin, sorbitol, a food protein (i.e., a whey protein isolate), and water, such that the binder system produces a soft, chewy, pliable binder. This binder system may be used as a binder, for example, in the manufacture of chewy granola-type bars, and particulate and/or powdered nutrition bars. The composition of this binder system is presented in Table 3.

TABLE 3

Formulation of Food Protein Containing Binder System

| Component | Percent (by weight) |
|---|---|
| Modified wheat protein isolate | 25% |
| Glycerin | 35% |
| Sorbitol | 5% |
| Whey protein isolate | 5% |
| Water | 30% |
| Total | 100% |

Example 4

Apple Crisp Bar Formulation

A formulation for an apple crisp bar was prepared using a binder system. The formulation was prepared with the binder system of Example 3. The formulation was compared to a control formulation comprising a binder system including corn syrup, dextrose, and high fructose corn syrup. Table 4 presents the ingredients of the control formulation and the test formulation.

TABLE 4

Ingredients for Apple Crisp Bar

| | Control | | Test | |
|---|---|---|---|---|
| Ingredients | Total (grams) | wt % | Total (grams) | wt % |
| Water | 4.88 | 4.78 | 4.88 | 4.88 |
| Dextrose (Clintose A) | 5.45 | 5.34 | 0 | 0.00 |
| 42/43 Corn Syrup | 14.3 | 14.01 | 0 | 0.00 |
| sorbitol solution | 3 | 2.94 | 3 | 3.00 |
| HFCS (high-fructose corn syrup) 42 | 6.09 | 5.97 | 0 | 0.00 |
| Brown Sugar | 1.95 | 1.91 | 1.95 | 1.95 |
| Sunflower oil | 5.5 | 5.39 | 5.5 | 5.50 |
| Beakin Lecithin LV-3 | 0.2 | 0.20 | 0.2 | 0.20 |
| Modified wheat protein isolate binder system | 0 | 0.00 | 25.84 | 25.84 |
| Powdered soy protein | 18.21 | 17.84 | 18.21 | 18.21 |
| 20% Malic Acid Solution | 1.46 | 1.43 | 1.46 | 1.46 |
| Soy Grits 8-20 | 1.95 | 1.91 | 1.95 | 1.95 |
| Oatmeal (Quick Oats) | 6.83 | 6.69 | 6.83 | 6.83 |
| Yogurt Coating | 21.48 | 21.05 | 21.48 | 21.48 |
| Vitamin & Mineral Premix | 3.2 | 3.14 | 3.2 | 3.20 |
| Low moisture infused apples | 4.1 | 4.02 | 4.1 | 4.10 |
| Flavors | 2.55 | 2.50 | 0.5 | 0.50 |
| Ground Cinnamon | 0.6 | 0.59 | 0.6 | 0.60 |
| Allspice | 0.3 | 0.29 | 0.3 | 0.30 |
| Total | 102.05 | 100.00 | 100 | 100.00 |

The control apple crisp bars are prepared using the following procedure: 1) dry ingredients are mixed in mixer at low speed for 15 seconds; 2) the high-fructose corn syrup, lecithin, oil, flavors, and spices are hand mixed in separate container and added to dry ingredients while mixing at low speed; 3) corn syrup is preheated, mixed with dextrose and water in a sauce pan, heated to 110° C.-116° C. (230° F.-240° F.) and held at that temperature for 2.5 to 3 minutes; 4) the cooked corn syrup solution is added to the mixture with mixing at low speed to fully incorporate into mixture; 5) the mixture is transferred to a sheet pan (from 0.64 to 1.27 cm (0.25 to 0.5 inches) in height) and pressed to mold as desired; and 6) 2 to 3 hours after pressing, the bars are drizzled with a yogurt coating.

The test apple crisp bars with the modified wheat protein isolate binder are prepared using the following procedure: 1) dry ingredients are mixed in mixer at low speed for 15 seconds; 2) the binder system is prepared as set forth in Example 3 in separate container and lecithin, oil, flavors, and spices are added to binder system; 3) the binder mixture is added to the dry ingredients and mixed at low speed to fully incorporate into the mixture; 5) the mixture is transferred to a sheet pan (from 0.64 to 1.27 cm (0.25 to 0.5 inches) in height) and pressed to mold as desired; and 6) 2 to 3 hours after pressing the bars is drizzled with a yogurt coating.

Example 5

High-Protein Peanut Bar with Soluble Fiber

A formulation for a high-protein peanut bar with soluble fiber was prepared using a modified wheat protein isolate binder system. The formulation is prepared with the modified wheat protein isolate binder system described in Example 2. The formulation was compared to a control formulation comprising a binder system including corn syrup. Table 5 presents the formulations of the control formulation and the test formulation.

TABLE 5

Ingredients for High-Protein Peanut Bar with Soluble Fiber

| | Control | | Test | |
|---|---|---|---|---|
| Ingredients | Total (grams) | wt % | Total (grams) | wt % |
| Powdered soy protein | 367.90 | 24.53 | 367.90 | 24.53 |
| Large diced soy nuts | 47.27 | 3.15 | 47.27 | 3.15 |
| Canola Oil | 73.59 | 4.91 | 73.59 | 4.91 |
| 62 DE Corn Syrup | 454.75 | 30.32 | 0.00 | 0.00 |
| Modified wheat protein isolate binder system | 0.00 | 0.00 | 454.75 | 30.32 |
| Soluble fiber | 82.68 | 5.51 | 82.68 | 5.51 |
| HFCS 55 (high-fructose corn syrup) | 227.38 | 15.16 | 227.38 | 15.16 |
| Creamy peanut butter | 141.82 | 9.45 | 141.82 | 9.45 |
| Flavors | 51.15 | 3.41 | 51.15 | 3.41 |
| Nat. Vitamin E | 1.10 | 0.07 | 1.10 | 0.07 |
| Vitamin and Minerals for bars | 44.10 | 2.94 | 44.10 | 2.94 |
| Distilled monoglycerides | 8.27 | 0.55 | 8.27 | 0.55 |
| Total | 1500.00 | 100.00 | 1500.00 | 100.00 |

The control and test high-protein peanut bars may be prepared as follows: 1) the binder systems were prepared as follows: (a) the corn syrup is mixed with the high-fructose corn syrup for the control or (b) the modified wheat protein isolate binder system, as set forth in Example 2, is mixed with the high-fructose corn syrup for the test formulation; 2) the soy protein powder, vitamin E and soluble fiber are mixed together; 3) distilled monoglycerides are melted in oil, added to the powder mixture and mixed at medium speed; 4) flavors and vitamin and mineral blend are added to the mixture and mixed at low speed; 5) one-third of the binder system mixture is added to the particulate mixture and mixed at low speed until fully incorporated; 6) the peanut butter is added and mixed until fully incorporated; 7) the remaining two-thirds of the binder system is added to mixture and mixed at low speed until fully incorporated; 8) the sides may be scraped and soy nuts are added and the composition mixed until fully incorporated; 9) the mixture is pressed into a uniform mass in rectangular pan, and cut into bars; and 10) the bars are optionally coated with a thin layer of confectionery coating.

Example 6

Low-Carbohydrate, Low-Calorie Crisped Rice or Oat Bar

Formulations for a low-carbohydrate, low-calorie crisped rice or oat bar were prepared using a modified wheat protein isolate binder system. Five formulations were prepared, four formulations including crisped rice and one formulation including oats. The low-calorie sweeteners, sucralose and acesulfame potassium ("Ace-K"), were used. The adhesive and binding properties of the modified wheat protein isolate binder system were demonstrated and suitable particulate binding and bar formation was observed. Two binder systems were examined, one using a 1:4 mixture of the modified wheat protein isolate and water (Formulations 1 and 2) and a second using a 1:2 mixture of the modified wheat protein isolate and water (Formulations 3-5). Table 6 presents the ingredients for the five Formulations.

TABLE 6

Ingredients for Crisped Rice or Oat Bar

| | Formulation | | | | |
|---|---|---|---|---|---|
| | 1 (Oats) | 2 (Rice) | 3 (Rice) | 4 (Rice) | 5 (Rice) |
| Corn oil | 90 g | 60 g | 120 g | 180 g | 240 g |
| Binder system | 250 g | 280 g | 220 g | 160 g | 100 g |
| wheat protein isolate:water | 1:4 | 1:4 | 1:2 | 1:2 | 1:2 |
| Oats | 550 g | — | — | — | — |
| Crisped rice | — | 165 g | 215 g | 215 g | 215 g |
| Sucralose | 0.18 g | 0.18 g | 0.083 g | 0.083 g | 0.083 g |
| Ace-K | 0.29 g | 0.29 g | 0.15 g | 0.15 g | 0.15 g |

The preparation procedure for Formulations 1 and 2 was as follows: 1) the sweeteners were added to the water; 2) the modified wheat protein isolate binder was added to the water; 3) the mixture was mixed on medium speed for 2 minutes; 4) the pH was adjusted to below 3 by addition of a citric acid solution; 5) the mixture was mixed for 6 minutes; 6) corn oil was folded in; and 7) the mixture was added to oats or crisped rice and formed in a pan, allowed to firm, and cut into bars. The preparation procedure for Formulations 3-5 was as follows: 1) the sweeteners were added to the water; 2) the modified wheat protein isolate binder was added to the water; 3) the mixture was mixed on medium speed for 30 seconds, the sides of the container were scraped, and the mixture mixed for an additional minute; 4) the pH was adjusted to below 3 by addition of a citric acid solution; 5) the mixture was mixed for 6.5 minutes; 6) corn oil was folded in; and 7) the mixture was added to crisped rice and formed in a pan, allowed to firm, and cut into bars.

Example 7

Cereal Cluster

A formulation of a cereal cluster may incorporate the particulate cereal pieces at a concentration of about 75% to about 90% by weight with the modified wheat protein isolate binder system at a concentration of about 10% to about 25% by weight. The particulate cereal pieces may comprise a combination of soy nuggets, textured soy protein concentrate, soy grits, high protein rice crisps, and rolled oats in approximately equal concentrations. The particulate pieces are blended to achieve a uniform mixture to which the modified wheat protein isolate binder system, as set forth in Example 1, is added. The combined mixture is mixed for about 10 minutes. After mixing, the mixture is spread out on a continuous oven belt and dried to create individual clusters.

Example 8

Process of Preparing a Food Component

In one embodiment, a food component includes a wheat protein isolate, a humectant, a sweetener, and water. The wheat protein isolate may be present in the food component at from 5% to 50% by weight of the food component, the humectant may be present from 0% up to 50% by weight of the food component, the sweetener may be present at from 0% up to 50% by weight of the food component, and water may be present from 5% to 60% by weight of the food component. The ingredients of the food component may be admixed into a slurry product and incorporated into a food composition to bind particulates of the food composition together, alter textural properties of the food composition, and/or stabilize ingredients of the food composition.

In one embodiment, the ingredients of the food component may be mixed together to form a food component mixture, and incorporated into a food product. In another embodiment, dry ingredients of the food component may be blended together into a first fraction, and wet ingredients of the food component may be admixed together into a second fraction. The first fraction and the second fraction may be placed into containers configured for shipping, wherein the containers are shipped to a location for incorporation into a food product. For instance, the wheat protein isolate alone or optionally combined with other dry ingredients may be placed into a first container and shipped. The humectant (e.g., glycerin) and sweetener (e.g., sorbitol) or the humectant and the sweetener optionally with other wet ingredients may be placed into a second container and shipped. In this embodiment, the dry ingredients may be mixed with water to form a slurry, and the slurry may be mixed with the wet ingredients to form a liquid or slurry food component system for incorporation into a food composition. In this embodiment, the containers may be associated with indicia directing a purchaser of the food component system on how to incorporate the food component system into a food product.

Example 9

Processes for Producing a Food Compositions

In another embodiment, a sweetener such as, for example, sorbitol may be produced from fructose and/or glucose using the enzymes sorbitol dehydrogenase and/or glucose dehydrogenase in combination with co-factors used by the enzymes. In one embodiment, the glucose and/or fructose may be isolated from agricultural products and placed in contact with the appropriate enzyme(s) to produce the sorbitol. In another embodiment, sorbitol may be produced by catalytic hydrogenation of glucose in the presence of Raney nickel. The sorbitol may be isolated for use in the food composition.

In another embodiment, a humectant, such as, for example, glycerin (also known as "glycerol"), may be produced or isolated from a biodiesel production process. For instance, the production of biodiesel from acylglycerols (i.e., triacylglycerols, diacylglycerols or monoglycerides) is accompanied by the generation of a glycerin by-product. The incubation of triacylglycerols with methanol and a catalyst results in an ester-exchange reaction that yields fatty acid methyl esters and glycerin. The glycerin-enriched co-product stream may be purified to produce food-grade glycerin.

The ingredients of the food composition may be used for producing the food composition or binder system described herein.

Example 10

Tack Coating with Binder

A formulation for a tack coating for adhering edible particulate materials to a surface of a food composition was formed from the modified wheat protein isolate, sugar and water. The sugar concentration may vary depending on the desired properties and sweetness. Ingredient compositions for two tack coating formulations are presented in Table 7.

TABLE 7

| Ingredient Composition for Tack Coatings | | |
|---|---|---|
| Ingredient (wt %) | Tack Coating 1 | Tack Coating 2 |
| Modified Wheat Protein Isolate | 15.00 | 10.35 |
| Granulated Sugar | 15.00 | 25.85 |
| Water | 70.00 | 63.80 |
| Total | 100.00 | 100.00 |

The preparation procedure for Tack Coatings 1 and 2 was as follows: 1) the modified wheat protein isolate was mixed with an equal amount of water until the protein isolate was fully hydrated; 2) water was continuously and gradually added while mixing; 3) the granulated sugar was added when about one-half of the total water had been added; and 4) mixing was continued while slowing adding the remaining water. The tack coatings may be used to adhere particulates to the surface of substrates, such as, but not limited to, frozen food products, wherein the tack coating and particulates are applied either before freezing the product or after freezing of the food product.

Example 11

Crunchy Cajun Bar

A formulation for a crunchy Cajun bar was prepared using the binder system. The Cajun bar was prepared using the binder system to bind together a Cajun party mix. The ingredients for the Cajun bar are presented in Table 8.

TABLE 8

| Crunchy Cajun Party Mix Bar | |
|---|---|
| Ingredients | Weight Percent |
| Cajun Party Mix | 75.00% |
| Modified Wheat Protein Isolate | 8.75% |
| Glycerin | 4.15% |
| Sunflower Oil | 1.60% |
| Water | 10.50% |
| Total | 100.00% |

The crunchy Cajun bar was prepared using either of the following two procedures. Procedure 1:1) the wheat protein isolate was placed in a mixer; 2) the liquid components (i.e., glycerin, sunflower oil, and water) were added to the wheat protein isolate with mixing at low speed; 3) the mixture was mixed at low speed for 1-2 minutes; 4) the Cajun party mix was blended into the mixture until completely incorporated; 5) the mixture was scraped into a pan and pressed into the desired shape; and 6) the composition was baked at 121° C.-177° C. (250° F.-350° F.) for 15-30 minutes, cooled and cut into the desired shape. Procedure 2: 1) the wheat protein isolate and the Cajun party mix were blended in a mixer; 2) the liquid components (i.e., glycerin, sunflower oil, and water) were added to the dry ingredients with mixing at low speed; 3) the mixture was mixed at low speed for 1-2 minutes; 4) the mixture was scraped into a pan and pressed into the desired shape; and 5) the composition was baked at 121° C.-177° C. (250° F.-350° F.) for 15-30 minutes, cooled and cut into the desired shape.

The Cajun party mix contained peanuts (peanuts, canola and/or soybean oil, salt), Cajun sesame hot stick (unbleached wheat flour (contains malted barley flour as a natural enzyme additive), soybean oil, sesame seeds, bulgur wheat, seasoning (salt, spices, dehydrated onion, torula yeast, green bell pepper, dehydrated garlic, cocoa powder, oleoresin paprika], salt, beet powder, turmeric), hot Cajun corn (corn masa, soybean oil, seasoning (spices, corn flour, salt, onion powder, potato flour, tomato powder, natural flavorings (coconut oil fractions), garlic powder, green bell pepper powder, extractives of paprika and other spices, citric acid), salt), oriental rice cracker (glutinous rice, soy sauce (water, soybean, wheat, salt), sugar, sesame seed, seaweed, chili, and artificial coloring U.S. FD & C Yellow #5 and #6). The resulting bar had a serving size of 30 g, with 150 calories per serving (90 calories from fat). The bar had 10 g total fat, of which 1.5 g were saturated fat and 0 g were trans-unsaturated fat; 0 mg of cholesterol; 300 mg of sodium; 10 g total carbohydrates (2.0 g dietary fiber); and 7 g protein.

Example 12

Crunchy Oats & Honey Granola Bar

A formulation for a crunchy oats and honey granola bar was prepared using the binder system. The oats and honey granola bar was prepared using the binder system to bind together the dry ingredients. The ingredients for the crunchy oats and honey granola bar are presented in Table 9.

TABLE 9

| Crunchy Oats & Honey Granola Bar | |
|---|---|
| Ingredients | Weight Percent |
| Oats | 41.55% |
| Soy Crisps | 4.62% |
| Soy Protein | 1.85% |
| Salt | 0.92% |
| Baking Soda | 0.23% |
| Modified Wheat Protein Isolate | 6.46% |
| Dry Honey Powder | 4.39% |
| Sunflower Oil | 9.92% |
| Soy Lecithin | 0.69% |
| Honey | 10.84% |
| Brown Sugar Flavor | 0.28% |
| Graham Flavor | 0.18% |
| Honey Flavor | 0.37% |
| Water | 17.70% |
| Total | 100.00% |

The crunchy oats and honey granola bar was prepared using either of the following two procedures. Procedure 1:1) the wheat protein isolate, salt, baking soda, and dry honey powder were placed in a mixer; 2) the liquid components (i.e., sunflower oil, soy lecithin, honey, flavorings, and water) were added to the dry powders with mixing at low speed; 3) the mixture was mixed at low speed for 1-2 minutes; 4) the oats, soy crisps, and soy protein were blended into the mixture until completely incorporated; 5) the mixture was scraped into a pan and pressed into the desired shape; and 6) the composition was baked at 121° C.-177° C. (250° F.-350° F.) for 15-30 minutes, cooled and cut into the desired shape. Procedure 2:1) the dry components (i.e., wheat protein isolate, salt, baking soda, dry honey powder, oats, soy crisps, and soy protein) were blended in a mixer; 2) the liquid components (i.e., sunflower oil, soy lecithin, honey, flavorings, and water) were added to the dry ingredients with mixing at low speed; 3) the mixture was mixed at low speed for 1-2 minutes; 4) the mixture was scraped into a pan and pressed into the desired shape; and 5) the composition was baked at 121° C.-177° C. (250° F.-350° F.) for 15-30 minutes, cooled and cut into the desired shape.

The resulting bar had a serving size of 30 g, with 110 calories per serving (35 calories from fat). The bar had 4 g total fat, of which 0.5 g were saturated fat and 0 g were trans-unsaturated fat; 0 mg of cholesterol; 160 mg of sodium; 8 g total carbohydrates (less than 1 g dietary fiber); and 4 g protein.

Example 13

Tropical Medley Bar

A formulation for a tropical medley bar was prepared using the binder system. The tropical medley bar was prepared using the binder system to bind together the dry ingredients. Ingredients for the tropical medley bar are presented in Table 10.

TABLE 10

Tropical Medley Bar

| Ingredients | Weight Percent |
| --- | --- |
| Oats | 15.80% |
| Soy Crisps | 10.55% |
| Oat Fiber Soy Crisps | 10.56% |
| Almonds | 7.89% |
| Tropical Fruit Mix | 26.30% |
| Modified Wheat Protein Isolate | 7.70% |
| FIBERSOL ® | 1.93% |
| BARFLEX ® | 2.57% |
| Glycerin | 10.28% |
| Sorbitol | 1.09% |
| Pina Colada Flavor | 0.19% |
| Water | 5.14% |
| Total | 100.00% |

The tropical medley bar was prepared using either of the following two procedures. Procedure 1:1) the wheat protein isolate, BARFLEX®(whey protein isolate, commercially available from Glanbia Ingredients, Inc., Monroe, Wis.), and FIBERSOL® (digestion resistant maltodextrin, commercially available from Matsutani Chemical Industry Co., Japan) were placed in a mixer; 2) the liquid components (i.e., glycerin, sorbitol, flavoring, and water) were added to the dry powders with mixing at low speed; 3) the mixture was mixed at low speed for 1-2 minutes; 4) the oats, oat fiber soy crisps, soy crisps, almonds, and tropical fruit mix were blended into the mixture until completely incorporated; and 5) the mixture was scraped into a pan and pressed into the desired shape. Procedure 2:1) the dry components (i.e., wheat protein isolate, BARFLEX®, FIBERSOL®, oats, oat fiber soy crisps, soy crisps, almonds, and tropical fruit mix) were blended in a mixer; 2) the liquid components (i.e., glycerin, sorbitol, flavoring, and water) were added to the dry ingredients with mixing at low speed; 3) the mixture was mixed at low speed for 1-2 minutes; and 4) the mixture was scraped into a pan and pressed into the desired shape.

The resulting bar had a serving size of 40 g, with 150 calories per serving (25 calories from fat). The bar had 2.5 g total fat, of which 0 g were saturated fat and 0 g were trans-unsaturated fat; 0 mg of cholesterol; 100 mg of sodium; 26 g total carbohydrates (2 g dietary fiber and 9 g sugars); and 6 g protein.

Example 14

Cereal and Milk Bar

A formulation for a cereal and milk bar was prepared using the binder system. The cereal and milk bar was prepared using the binder system to bind together the dry ingredients. Table 11 presents the ingredients for the cereal and milk bar.

TABLE 11

Cereal and Milk Bar

| Ingredients | Weight Percent |
| --- | --- |
| Cereal Pieces | 55.00% |
| Modified Wheat Protein Isolate | 11.52% |
| Whey Protein Isolate | 2.22% |
| Nonfat Dry Milk | 2.22% |
| Glycerin Blend | 17.29% |
| Condensed Milk | 2.22% |
| Sunflower Oil | 0.89% |
| Flavoring | 1.10% |
| Water | 7.54% |
| Total | 100.00% |

The cereal and milk bar was prepared using either of the following two procedures. Procedure 1:1) the wheat protein isolate, whey protein isolate and nonfat dry milk were placed in a mixer; 2) the liquid components (i.e., condensed milk, glycerin blend, sunflower oil, flavoring, and water) were added to the dry powders with mixing at low speed; 3) the mixture was mixed at low speed for 1-2 minutes; 4) the cereal pieces (toasted oats and the like) were blended into the mixture until completely incorporated; and 5) the mixture was scraped into a pan and pressed into the desired shape. Procedure 2: 1) the dry components (i.e., wheat protein isolate, whey protein isolate nonfat dry milk, and cereal pieces) were blended in a mixer; 2) the liquid components (i.e., condensed milk, glycerin blend, sunflower oil, flavoring, and water) were added to the dry ingredients with mixing at low speed; 3) the mixture was mixed at low speed for 1-2 minutes; and 4) the mixture was scraped into a pan and pressed into the desired shape.

The resulting bar had a serving size of 40 g, with 150 calories per serving (20 calories from fat). The bar had 2 g total fat, of which 0 g were saturated fat and 0 g were trans-unsaturated fat; 0 mg of cholesterol; 180 mg of sodium; 25 g total carbohydrates (<1 g dietary fiber and 9 g sugars); and 7 g protein.

Example 15

Honey Nut Clusters with Sugar

A formulation for a honey nut cluster with sugar was prepared using the binder system. The honey nut clusters with sugar were prepared using the binder system to bind together the dry ingredients. The ingredients for the honey nut cluster with sugar are presented in Table 12.

TABLE 12

Honey Nut Clusters with Sugar

| Ingredients | Weight Percent |
|---|---|
| Oats | 15.00% |
| Crisps | 30.00% |
| Almonds | 15.00% |
| Modified Wheat Protein Isolate | 12.00% |
| Whey Protein Isolate | 3.00% |
| Dry Honey Powder | 2.50% |
| 67.5° Brix Liquid Sugar | 10.00% |
| Glycerin | 2.50% |
| Water | 10.00% |
| Total | 100.00% |

The honey nut clusters with sugar were prepared using either of the following two procedures. Procedure 1:1) the wheat protein isolate, whey protein isolate, and dry honey powder were placed in a mixer; 2) the liquid components (i.e., liquid sugar, glycerin, and water) were added to the dry powders with mixing at low speed; 3) the mixture was mixed at low speed for 1-2 minutes; 4) the oats, crisps, and almonds were blended into the mixture until completely incorporated; and 5) the mixture was scraped into a pan and pressed into the desired shape. Procedure 2:1) the dry components (i.e., wheat protein isolate, whey protein isolate, dry honey powder, oats, crisps, and almonds) were blended in a mixer; 2) the liquid components (i.e., liquid sugar, glycerin, and water) were added to the dry ingredients with mixing at low speed; 3) the mixture was mixed at low speed for 1-2 minutes; and 4) the mixture was scraped into a pan and pressed into the desired shape.

The resulting clusters had a serving size of 40 g, with 170 calories per serving (40 calories from fat). Each cluster serving had 4 g total fat, of which 0 g were saturated fat and 0 g were trans-unsaturated fat; 0 mg of cholesterol; 130 mg of sodium; 25 g total carbohydrates (1 g dietary fiber and 6 g sugars); and 9 g protein.

Example 16

Honey Nut Clusters without Sugar

A formulation for a honey nut cluster without sugar was prepared using the binder system. The honey nut clusters without sugar were prepared using the binder system to bind together the dry ingredients. The ingredients for the honey nut cluster without sugar are presented in Table 13.

TABLE 13

Honey Nut Clusters without Sugar

| Ingredients | Weight Percent |
|---|---|
| Oats | 15.00% |
| Crisps | 30.00% |
| Almonds | 15.00% |
| Modified Wheat Protein Isolate | 13.00% |
| Whey Protein Isolate | 4.00% |
| Dry Honey Powder | 2.50% |

TABLE 13-continued

Honey Nut Clusters without Sugar

| Ingredients | Weight Percent |
|---|---|
| Glycerin | 6.00% |
| Water | 14.50% |
| Total | 100.00% |

The honey nut clusters without sugar were prepared using either of the following two procedures. Procedure 1:1) the wheat protein isolate, whey protein isolate, and dry honey powder were placed in a mixer; 2) the liquid components (i.e., glycerin, and water) were added to the dry powders with mixing at low speed; 3) the mixture was mixed at low speed for 1-2 minutes; 4) the oats, crisps, and almonds were blended into the mixture until completely incorporated; and 5) the mixture was scraped into a pan and pressed into the desired shape. Procedure 2:1) the dry components (i.e., wheat protein isolate, whey protein isolate, dry honey powder, oats, crisps, and almonds) were blended in a mixer; 2) the liquid components (i.e., glycerin, and water) were added to the dry ingredients with mixing at low speed; 3) the mixture was mixed at low speed for 1-2 minutes; and 4) the mixture was scraped into a pan and pressed into the desired shape.

The resulting clusters had a serving size of 40 g, with 170 calories per serving (50 calories from fat). Each cluster serving had 5 g total fat, of which 0 g were saturated fat and 0 g were trans-unsaturated fat; 0 mg of cholesterol; 190 mg of sodium; 24 g total carbohydrates (2 g dietary fiber and 3 g sugars); and 8 g protein.

Example 17

Caramel with Wheat Protein Binder

A formulation for caramel was prepared using the binder system. The ingredients for the caramel are presented in Table 14.

TABLE 14

Heart health caramel

| Ingredients | Weight Percent |
|---|---|
| Sweetened condensed milk | 29.73% |
| Sucrose | 13.51% |
| ADM 42/43 Corn syrup | 12.97% |
| FIBERSOL ® | 0 (optional) |
| 55 DE high fructose corn syrup | 3.24% |
| ADM coconut/soybean 105° oil | 4.59% |
| Butter | 3.14% |
| ADM Cardio Aid sterols | 3.14% |
| Salt | 0.54% |
| ADM Yelkin TS lecithin | 0.43% |
| Vanilla flavor | 0.22% |
| Modified wheat protein isolate | 13.52% |
| Water | 13.52% |
| Total | 100.00% |

The sweetened condensed milk and corn syrups were combined in a saucepan and subjected to heat. The coconut/soybean oil, butter, sterol esters, and lecithin were slowly added to mixture in the saucepan. The sucrose, optionally FIBERSOL®, and salt were added to the heating mixture, and the resultant sugar mixture was constantly stirred with a heat resistant spatula until a temperature of 110° C.-116° C. (230° F.-240° F.) was reached. In another container, the modified wheat protein isolate was mixed with the water to a smooth batter consistency. The sugar mixture was removed from the heat and the modified wheat protein isolate mixture was slowly added to the sugar mixture, and mixed until smooth. The finished caramel product was poured into a pan and allowed to cool. The caramel may be used to bind various food particulates together or used to adhere various food particulates to a food product.

Although the foregoing description has necessarily presented a limited number of exemplary embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications will remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the claims.

We claim:

1. A method, comprising:
    mixing a wheat protein isolate, a humectant and lecithin with water, thus forming a slurry having 5-50% by weight of the wheat protein isolate and 5-60% by weight of the water; and
    spraying the slurry on at least a portion of a surface of a food product.

2. The method according to claim 1, further comprising mixing a sweetener with the slurry.

3. The method according to claim 1, wherein the humectant is selected from the group consisting of glycerin, sorbitol, mannitol, lactitol, isomalt, xylitol, maltitol, hydrogenated corn syrup, and combinations of any thereof.

4. The method of claim 1, further comprising mixing an ingredient selected from the group consisting of milk protein, caseinate, whey protein, whey protein isolate, buttermilk solids, milk powders, egg protein, gelatin, soy protein, soy protein isolate, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof with the slurry.

5. The method according to claim 1, further comprising spraying the slurry on a plurality of the food products.

6. The method according to claim 1, further comprising placing a food particle in contact with the slurry sprayed on the at least the portion of the surface of the food product such that the food particle adheres to the food product.

7. The method of claim 1, further comprising adding baking soda to the slurry.

8. The method of claim 1, wherein the slurry does not have any added fat.

9. A food composition comprising:
    a food product; and
    a coating covering at least a portion of a surface of the food product;
    the coating comprising:
        15-35% by weight of a wheat protein isolate;
        30-55% by weight of glycerin;
        5-25% by weight of sorbitol; and
        10-45% by weight of water;
        wherein the coating does not include an added lipid.

10. The food composition of claim 9, the coating further comprising a compound selected from the group consisting of mannitol, lactitol, isomalt, xylitol, maltitol, hydrogenated corn syrup, and combinations of any thereof.

11. The food composition of claim 9, the coating further comprising an additional protein selected from the group consisting of milk protein, caseinate, whey protein, whey protein isolate, buttermilk solids, milk powders, egg protein, gelatin, soy protein, soy protein isolate, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, and combinations of any thereof.

12. The food composition of claim 9, the coating further comprising an ingredient selected from the group consisting of dried fruit pieces, a colorant, a flavorant, an emulsifier, an acidulant, a sweetener, a vitamin, a mineral, a spice, a fiber, a protein powder, a nutraceutical, a sterol, an isoflavone, a lignan, glucosamine, an herbal extract, xanthan, a gum, a hydrocolloid, a starch, a preservative, a legume product, and combinations of any thereof.

13. The food composition of claim 9, wherein the wheat protein isolate comprises wheat gluten treated with an acid and a reducing agent and has reduced viscoelastic properties as compared to a wheat protein isolate that has not been treated with the acid and the reducing agent.

14. The food composition of claim 9, wherein the food product is a cereal flake, a cereal piece or a muffin.

15. A food composition comprising:
    food particulates; and
    a matrix binding at least a portion of the food particulates together;
    the matrix consisting of;
        5-50% by weight of a wheat protein isolate;
        a sweetener;
        5-60% by weight of water and
        a humectant.

16. The food composition of claim 15, wherein the food particulates are selected from the group consisting of cereal grains, cereal flakes, crisped rice, puffed rice, oats, crisped oats, granola, wheat cereals, protein nuggets, textured soy flour, textured soy protein concentrate, texturized protein ingredients, flavored nuggets, cookie pieces, cracker pieces, pretzel pieces, crisps, soy grits, nuts, fruit pieces, corn cereals, seeds, popcorn, yogurt pieces, and combinations of any thereof.

* * * * *